(12) United States Patent
Simeray

(10) Patent No.: US 10,368,698 B2
(45) Date of Patent: Aug. 6, 2019

(54) MULTI-PURPOSE CORDLESS TABLE GRATER

(71) Applicant: Alain Chemama, Le Chesnay (FR)

(72) Inventor: Marc Daniel Simeray, Conflans Saint Honorine (FR)

(73) Assignee: Alain Chemama, Le Chesnay (FR)

( * ) Notice: Subject to any disclaimer, the term of this patent is extended or adjusted under 35 U.S.C. 154(b) by 409 days.

(21) Appl. No.: 15/035,149

(22) PCT Filed: Nov. 7, 2014

(86) PCT No.: PCT/EP2014/074100
§ 371 (c)(1),
(2) Date: May 6, 2016

(87) PCT Pub. No.: WO2015/067783
PCT Pub. Date: May 14, 2015

(65) Prior Publication Data
US 2016/0287019 A1    Oct. 6, 2016

Related U.S. Application Data

(60) Provisional application No. 61/901,469, filed on Nov. 8, 2013.

(51) Int. Cl.
*A47J 43/25* (2006.01)
(52) U.S. Cl.
CPC .................................. *A47J 43/255* (2013.01)
(58) Field of Classification Search
CPC .............................. A47J 43/25; A47J 43/255

USPC ............ 241/166, 168, 169, 169.1, 272, 283; 144/28.5, 28.72
See application file for complete search history.

(56) References Cited

U.S. PATENT DOCUMENTS

| | | | | |
|---|---|---|---|---|
| 5,138,940 A | * | 8/1992 | Geissler | A47J 25/00 83/672 |
| 7,207,509 B2 | * | 4/2007 | Mazza | A47J 43/255 241/169.1 |
| 7,648,088 B2 | * | 1/2010 | Eikelenberg | A47J 43/255 241/168 |
| 2004/0155130 A1 | * | 8/2004 | Wang | A47J 42/44 241/169.1 |
| 2005/0040265 A1 | * | 2/2005 | Pai | A47J 43/255 241/169.1 |
| 2006/0176770 A1 | * | 8/2006 | Sands | A47J 43/046 366/205 |

FOREIGN PATENT DOCUMENTS

GB        2500277        9/2013

* cited by examiner

*Primary Examiner* — Shelley M Self
*Assistant Examiner* — Jared O Brown
(74) *Attorney, Agent, or Firm* — Duane Morris LLP; Gregory M. Lefkowitz; Jason M. Nolan

(57) ABSTRACT

The present invention pertains to a cordless electrical grater, comprising a washable food container and a cordless electrical device, wherein the last one can be inserted substantially inside the free cavity of the first one in order to minimize the size, wherein interaction between both allow working cycles, wherein no turning parts are exposed, wherein pressing the food container on the electrical base activates the device.

8 Claims, 5 Drawing Sheets

Figure 1a
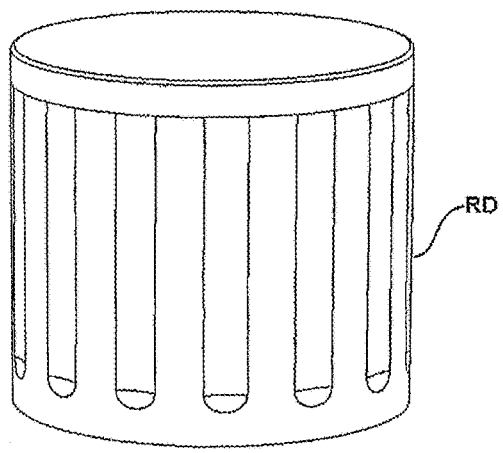
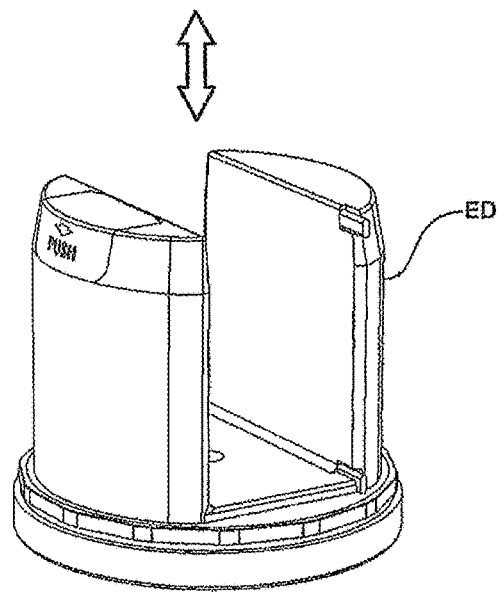
Figure 1b
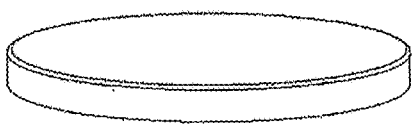
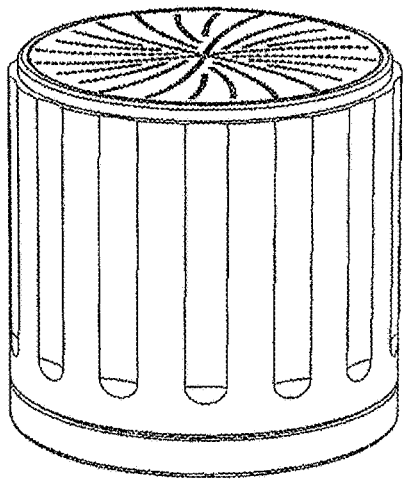

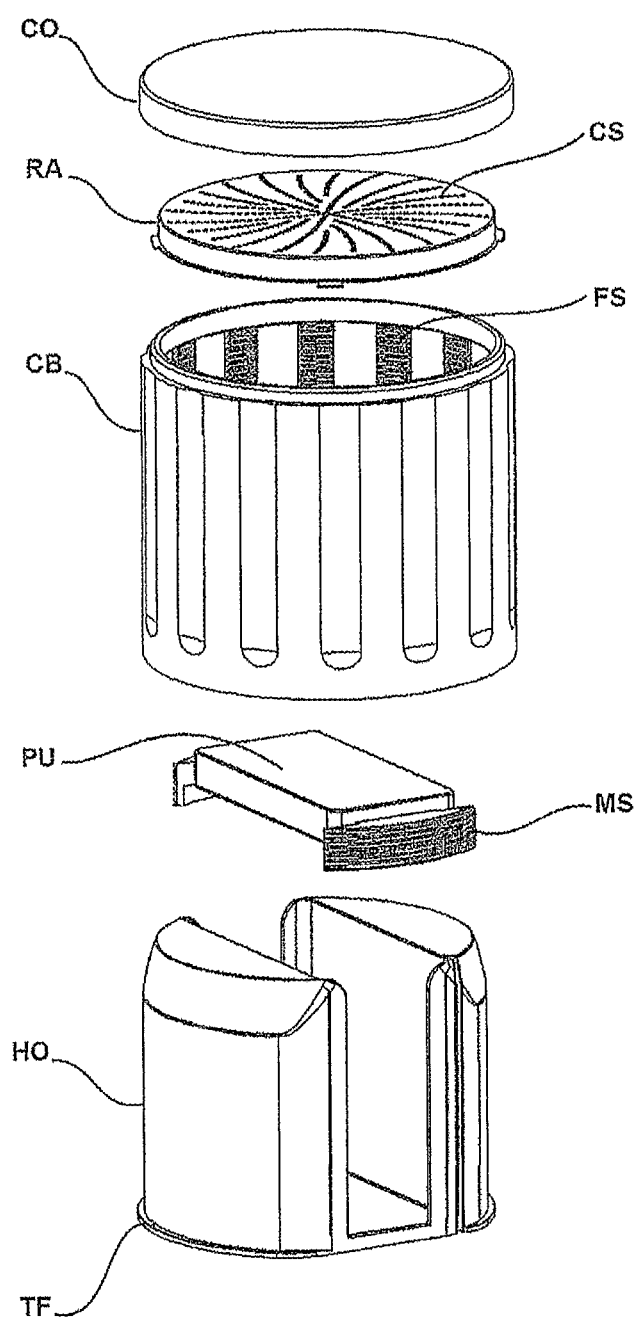

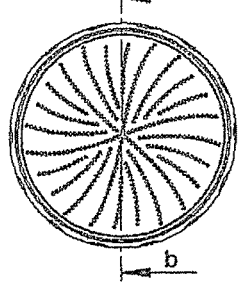
Figure 5a
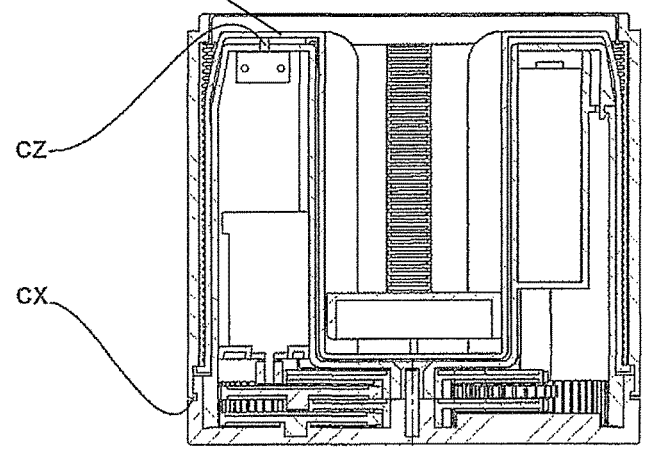
turning contact surface
Figure 5b
CZ
CX
Figure 5c
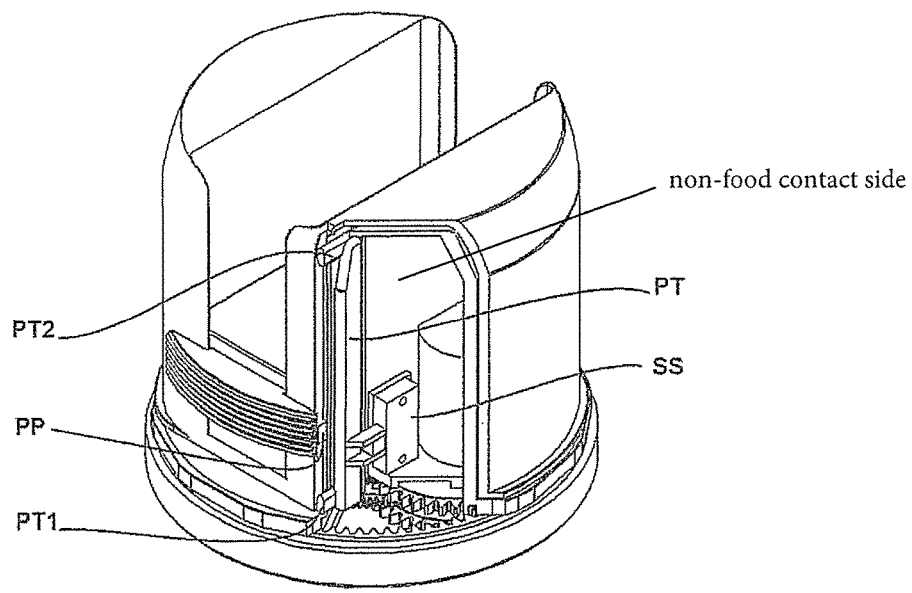
non-food contact side
PT
PT2
SS
PP
PT1

MULTI-PURPOSE CORDLESS TABLE GRATER

CROSS-REFERENCE TO RELATED APPLICATIONS

This application is a § 371 national stage entry of International Application No. PCT/EP2014/074100, filed Nov. 7, 2014, which claims priority to U.S. Provisional Patent Application No. 61/901,469 filed Nov. 8, 2013, the entire contents of which is incorporated herein by reference.

FIELD OF THE INVENTION

This invention pertains generally to the field of the grater for kitchen, and more especially to a cordless electrically powered grater designed to grate blocks of fresh and hard food such as hard cheese, cold butter, radish but not only, suitable for food preparation as well as to be laid on a table and to be used during the meal. We exclude from the field of the invention the grinding devices which are not a cutting way and more specifically designed for non-perishable foodstuff, the slicers and electrical blender devices which are not proper to generate the filaments shape of a grater, the non-electrical graters, and the electrical graters powered by means of a cord.

BACKGROUND OF THE INVENTION

Graters are commonly used to cut ingredients during the preparation time; the state of the art of graters shows different designs: most of the designs are working manually or powered by a power outlet.

Those designed for food preparations without a container are to be used at a working place and to be cleaned afterwards; due to preservation issue, ingredients also need to be removed; not suitable for use during the meal, not optimized for daily use.

Those operated manually often require the use of both hands, not optimized for elderly or disabled people; Those working with a long working stroke are not convenient to reinitialize manually up to the filling position (for example a pusher operated by a driving screw).

Those electrically powered which require proximity of supply power socket, are not always available at a meal time and often noisy.

Finally, the container of the grater with its fresh food has to be preserved; when for convenience of easy daily use, the whole device, container with grater, is kept assembled, a key point being to minimize the volume of the device in the fridge's limited space.

Existing graters are not fully optimized to provide all the comfort of use that could be desired during a relaxed and quiet meal time.

DESCRIPTION OF THE INVENTION

It is therefore a purpose of the invention to provide a compact cordless electric grater enhanced by the insertion of the electrical devices inside the free cavity of the food container in order to minimize the whole volume and reduce the working noise, and to offer a device that can be used everywhere, and without the need to disassemble and clean each time after use. It is a further purpose of the present invention to make it working intuitively with one hand thanks to ergonomic and automatic design, and to offer a multi-purpose device working in the up and down directions in one appliance.

The invention proposes a cordless electrical grater, including a first sub assembly as a washable food container with the grater and a cordless electrical second sub assembly wherein:

the size and the working noise of the appliance are minimised thanks to
the powered device embedding the motor and the battery, inserted in
at least one cavity enclosed by the non-food contact side surface of the food holder turning inside the housing remaining static;
the motor is electrically powered by a vertical pressure on transmitted to a push switch embedded in facing up thanks to a turning contact.

Notably the cordless electrical grater, includes:
a first sub assembly with a grater; and
a cordless electrical second sub assembly having:
a motor,
a battery, and
a push switch faced towards the first sub assembly, so that the motor is electrically powered by a vertical pressure on the first sub assembly transmitted to the push switch.

Particularly, the first sub assembly may comprise a turning contact, the push switch of cordless electrical second sub assembly facing the turning contact so that the vertical pressure on the housing of the first sub assembly empowering electrically the motor is transmitted to the push switch thanks to the turning contact.

More particularly, the first sub assembly, as a washable food container, may comprise, in addition to the grater and the turning contact,
a housing (CB) designed to remain static during use of the cordless electrical grater; and
a food holder (HO) designed to turn inside the housing (CB) with the turning contact during use of the cordless electrical grater.

In other words, the cordless electrical grater includes
a first sub assembly as a washable food container comprising
a grater;
a housing designed to remain static during use of the cordless electrical grater; and
a food holder designed to turn inside the housing with a turning contact during use of the cordless electrical grater, and
a cordless electrical second sub assembly having:
a motor,
a battery,
a push switch facing the food holder of the first sub assembly;
the cordless electrical grater being designed such that the motor of the cordless electrical second sub assembly is electrically powered by a vertical pressure on the housing of the first sub assembly transmitted to the push switch thanks to the turning contact of the food holder.

Particularly, the food holder may have a non-food contact side surface enclosing a cavity into which the cordless electrical second sub assembly is inserted.

According to a preferred embodiment, the pusher activates at the stroke ends thanks to a pull tab a slide switch that permutes polarities of the motor in order to reverse motion and automatically reinitialize pusher to the filling position.

Notably, the first sub assembly comprises a pusher that moves vertically with respect to the food holder when the food holder is rotated inside the housing, from a filling position to a top position, the pusher having a pull tab, the cordless electrical second sub assembly comprising a slide switch arranged such that it is activated at the stroke ends of the pusher, thanks to the pull tab of the pusher to permute polarities of the motor in order to reverse motion and automatically reinitialize pusher to the filling position.

According to another preferred embodiment, the motor embedded inside the driving body transmits its power to a planetary gear box situated inside the bottom body, wherein the internal perimeter of the driving body includes the design of an internal gear.

Notably, the cordless electrical second sub assembly comprises:
 a bottom body comprising a planetary gear box within;
 a driving body
  having an internal perimeter including the design of an internal gear,
   embedding the motor within, which transmits its power to the planetary gear box situated inside the bottom body.

According to a further preferred embodiment, the working in down orientation is activated automatically by ball switch.

Notably, the cordless electrical second sub assembly may comprises a ball switch so that when the cordless electrical grater is used in down orientation, it is activated automatically.

The invention relates to a multi-purpose cordless electrical grater designed for perishable foodstuff specifically, with the combination of a first washable sub assembly consisting of a grater with container, and a second sub-assembly which is a cordless electrical device that fits substantially inside the first one, wherein the grater device of first sub assembly RD comprises at least:
 a housing CB, substantially like a hollow cylindrical body threaded internally, wherein, in a preferred embodiment, the threads are discontinuous, arranged in a circular array, wherein the top side includes features to fix a grater, wherein the top side includes feature to fit with a lid, wherein the bottom side includes features CF to limit or block rotation and axial move with another body when it is working, wherein the width of the thread are embossed and generate a flat section PS suitable to push another body from the bottom side,
 a metal grater RA that closes the top side of the first body CB, including a plurality of cutting shapes CS suitable to fully cut the food according to the pitch of the thread; wherein the metal grater can be removable and changed to offer different shapes of food,
 a pusher PU, substantially flat and rectangular support, threaded at both opposite sides PU1 and PU2 of same pitch, that rotates when a moment is applied on one of the other free sides PU3 or PU4 and move vertically like a pusher, wherein a lug PP is used to detect limit of the stroke,
 a holder HO consisting of a fork, designed free at the middle in order to receive the pusher from the top, with the two sides facing the center OH3 & OH4 substantially flat and vertical as a guiding feature, and the two other sides OH1 and OH2 circular in order to maximize the two interior cavities, wherein the height of the fork is similar as first body CB in order to transmit torque to the pusher along the threaded axis, wherein the bottom can turn freely inside first body CB, wherein also the body is shell-shaped in order to receive inside from the bottom way another second sub- assembly combined, wherein the bottom includes embossed circular flats externally of the forks TF in order to receive force from the flat surface PS of body CB, wherein two small openings OP1 and OP2, substantially distant of the pusher stroke, are situated at a corner of a fork, in order to allow a detection through the body with the pusher lug PP,
 a lid body CO that fits with the top side of the first body CB to protect the grater from any dirt on the cutting surface after use, and improve preservation of the food;

Wherein a cordless electrically powered device of second sub assembly ED comprises at least:
 a base body BB designed to fit substantially with the bottom perimeter of the body CB providing an assembly linkage that blocks rotation and axial move during use thanks to details of form BF, but also keeping the stroke CX of a vertical push switch CZ, in order to make the device work,
 a driving body DB rotating inside the bottom part BB, designed to transmit power to the body HO, with fork-shape fitting inside the two cavities HO where the motor MO and the batteries BA are embedded in order to minimize the volume and reduce the working noise in working configuration;
 a pull tab body PT sliding vertically, situated mainly inside the driving body DB, comprising two protrusion PT1 and PT2 crossing respectively the openings OP1 and
  OP2 slightly outside, distant from the pusher stroke added to the height of the lug PP of the pusher, As a feature of the invention, when pusher is at the top end, the lug PP pushes up the protrusion PT2 to reverse automatically motion to the down direction (up to the filling position), when pusher is at the bottom stroke, the lug pushes down the protrusion PT1 to reverse move and reinitialize automatically the working up direction, all by activation of rocking contacts of a switch SS; This switch, connected to the pull tab, works with two stable positions and two contacts in to order to permute polarity of the motor; this preferred embodiment provides an economic way to realize a reciprocal motion of the pusher with only one rocking switch.

As a feature of the invention, the device is activated conditionally by the action of pressing the container body CB on the base BB thanks to a turning contact realized between the static surface FS on the turning surface TF thanks to a switch CZ situated inside the body DB and facing up the HO body according the main axial direction; This solution limits the reciprocal motion to one cycle. That makes it possible to use the top way (grater facing up) or by reversing orientation of the device, (grater facing down). Additionally, the device may comprise a ball switch to automatically activate the working of the device, when the device is used in a down orientation.

As a feature of the invention, the kinematic train GB according diagram FIG. 4c is designed to have the main electrical components embedded inside the driving body DB in order to keep the outside of the product free from turning parts in working configuration. The motor output is facing the base with the output of the gear box on part BB;

Other parts as a motor MO and batteries BA suitable to stand the temperature in fridge, a gear box GB, but not only.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 1a, FIG. 1b are perspective views of the two subassemblies respectively in separated working configuration, in accordance embodiment of the present invention; configuration and in with the preferred embodiment of the present invention;

FIG. 2a is a perspective exploded view of the grater container sub assembly in accordance with the preferred embodiment of the present invention

FIG. 5a is a top view of the device in working configuration, FIG. 5b is a section view b-b from FIG. 5a, FIG. 5c is a section view in perspective to show the pull tab feature in accordance with the preferred embodiment of the present invention.

Figure 3A:
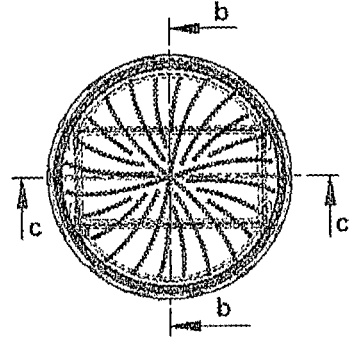
FIG. 3a is a top view of sub assembly RB and FIG. 3b, FIG. 3c are respectively section views b-b and c-c from FIG. 3a, in accordance with the preferred embodiment of the present invention.
Figure 3B:
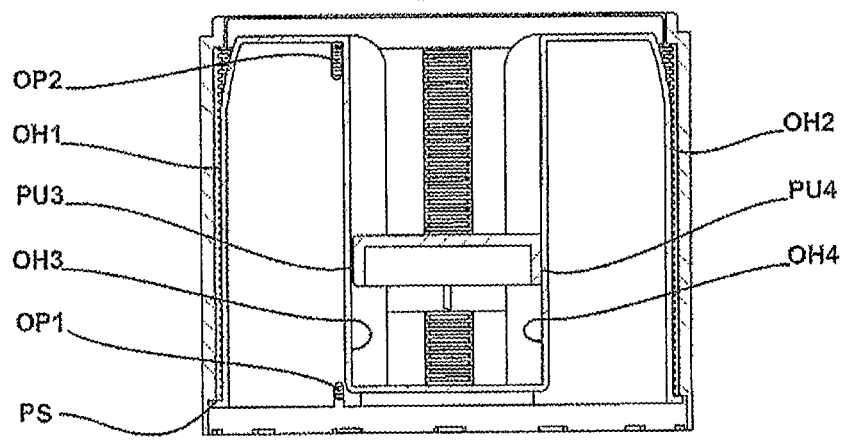
Figure 3C:
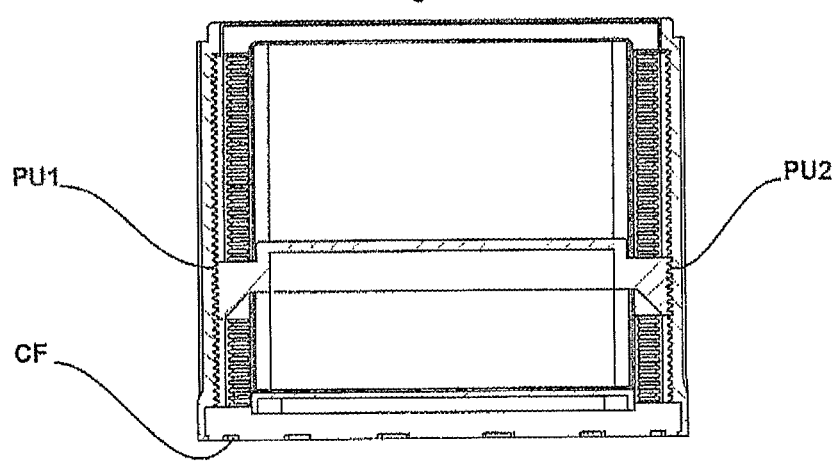
Figure 4A:
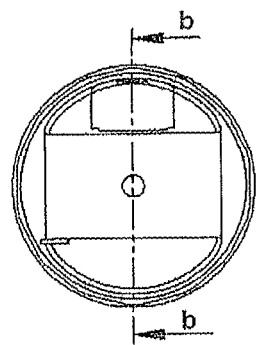
FIG. 4a is a top view of sub assembly ED.
Figure 4B:
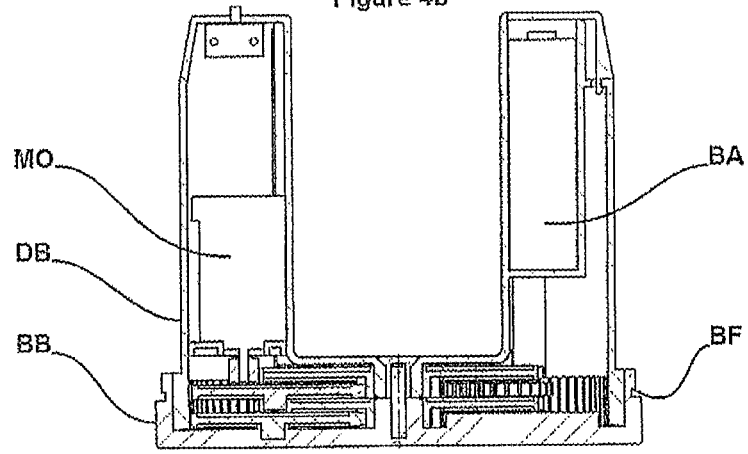
FIG. 4b is a section view b-b from FIG. 4a, FIG. 4c is a kinematic train diagram in accordance with the preferred embodiment of the present invention.
Figure 4C:
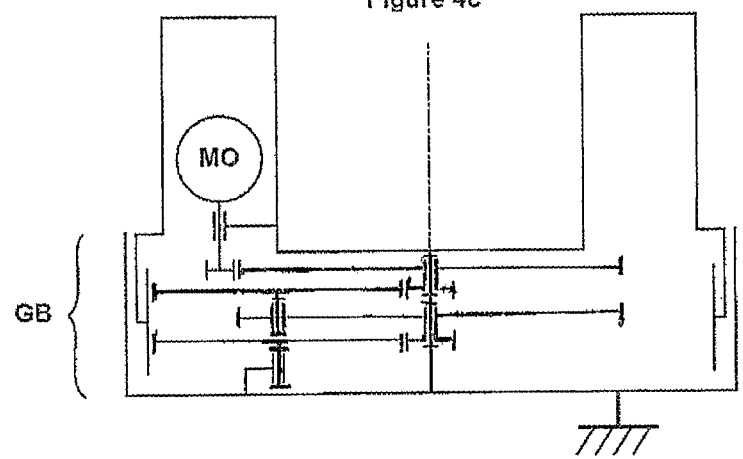

The invention claimed is:

1. A cordless electrical grater, comprising:
   a first sub assembly (RD) comprising a grater; and
   a cordless electrical second sub assembly (ED) comprising:
      a motor,
      a battery, and
      a push switch faced towards the first sub assembly, so that the motor is electrically powered by a vertical pressure on the first sub assembly transmitted to the push switch;
   wherein the first sub assembly (RD) further comprises:
      a housing (CB) adapted to remain static during use of the cordless electrical grater;
      a turning contact surface facing the push switch of the cordless electrical second sub assembly (ED) and the vertical pressure transmitted to the push switch electrically powers the motor;
      a food holder (HO) adapted to turn inside the housing (CB) with the turning contact surface during use of the cordless electrical grater, and
      wherein the first sub assembly (RD) is a washable food container.

2. The cordless electrical grater according to claim 1, wherein the food holder (HO) has a non-food contact side surface enclosing a cavity into which the cordless electrical second sub assembly is inserted.

3. The cordless electrical grater of claim 1, wherein the first sub assembly (RD) further comprises:
   a pusher that moves vertically with respect to the food holder when the food holder is rotated inside the housing, from a filling position to a top position,
   the pusher having a lug,
   the cordless electrical second sub assembly (ED) further comprising a slide switch adapted to be activated at stroke ends of the pusher when the lug of the pusher engages a protrusion of a pull tab inside the driving body to permute polarities of the motor in order to reverse motion and automatically reinitialize the pusher to the filling position.

4. The cordless electrical grater of claim 1 wherein the cordless electrical second sub assembly (ED) comprises:
   a bottom body comprising a planetary gear box;
   a driving body comprising
      an internal perimeter enclosing the planetary gear box, and
      the motor, which transmits power to the planetary gear box situated inside the bottom body.

5. The cordless electrical grater of claim 2, wherein the cordless electrical second sub assembly (ED) comprises:
   a bottom body comprising a planetary gear box;
   a driving body comprising
      an internal perimeter enclosing the planetary gear box, and
      the motor, which transmits power to the planetary gear box situated inside the bottom body.

6. The cordless electrical grater of claim 3, wherein the cordless electrical second sub assembly (ED) comprises:
   a bottom body comprising a planetary gear box;
   a driving body comprising
      an internal perimeter enclosing the planetary gear box, and
      the motor, which transmits power to the planetary gear box situated inside the bottom body.

7. A cordless electrical grater comprising:
   a first sub assembly (RD) comprising:
      a grater; and
      a turning contact surface, wherein the turning contact surface faces a push switch of a cordless electrical second sub assembly (ED) and a vertical pressure transmitted to the push switch electrically powers a motor
   wherein the first sub assembly (RD) further comprises:
      a housing (CB) adapted to remain static during use of the cordless electrical grater; and
      a food holder (HO) adapted to turn inside the housing (CB) with the turning contact surface during use of the cordless electrical grater, and wherein the first sub assembly (RD) is a washable food container
   the cordless electrical second sub assembly (ED) comprising:
      the motor,
      a battery, and
      the push switch faced towards the first sub assembly, so that the motor is electrically powered by the vertical pressure on the first sub assembly transmitted to the push switch;
   wherein the cordless electrical second sub assembly (ED) further comprises:
   a bottom body comprising a planetary gear box;
   a driving body comprising:
      an internal perimeter enclosing the planetary gear box, and
      the motor, which transmits power to the planetary gear box situated inside the bottom body.

8. The cordless electrical grater of claim 7, wherein the first sub assembly (RD) further comprises:
   a pusher that moves vertically with respect to the food holder when the food holder is rotated inside the housing, from a filling position to a top position,
   the pusher having a lug,
   the cordless electrical second sub assembly (ED) further comprising a slide switch configured to be activated at the stroke ends of the pusher when the lug of the pusher engages a protrusion of a pull tab inside the driving body to permute polarities of the motor in order to reverse motion and automatically reinitialize the pusher to the filling position.

* * * * *